United States Patent [19]

Wang

[11] Patent Number: 4,752,739
[45] Date of Patent: Jun. 21, 1988

[54] DEVICE FOR MEASURING THE THICKNESS OF THIN METALLIC LAYERS DEPOSITED ON A CONDUCTIVE SUPPORT

[75] Inventor: Robert Wang, Wissous, France

[73] Assignee: Stein Heurtey, Ris Orangis, France

[21] Appl. No.: 790,968

[22] Filed: Oct. 24, 1985

[30] Foreign Application Priority Data

Oct. 16, 1984 [FR] France ............................... 84 16290

[51] Int. Cl.⁴ .......................... G01B 7/10; G01B 7/14; G01R 33/12
[52] U.S. Cl. ................................. 324/230; 324/207; 324/227; 324/233
[58] Field of Search ................................ 324/229–231, 324/233, 222, 227, 207, 208

[56] References Cited

U.S. PATENT DOCUMENTS

| | | | |
|---|---|---|---|
| 2,116,119 | 5/1938 | Loewenstein | 324/229 |
| 2,764,734 | 9/1956 | Yates | 324/229 |
| 3,229,198 | 1/1966 | Libby . | |
| 3,358,225 | 12/1967 | Peugeot . | |
| 3,535,625 | 10/1970 | Pratt | 324/233 |
| 3,626,344 | 12/1971 | Shaternikov et al. . | |
| 3,878,457 | 4/1975 | Rodgers | 324/229 |
| 3,986,105 | 10/1976 | Nix et al. . | |
| 4,652,823 | 3/1987 | Sutton | 324/233 X |

FOREIGN PATENT DOCUMENTS

| | | | |
|---|---|---|---|
| 0052058 | 5/1982 | European Pat. Off. | 324/242 |
| 0129282 | 12/1984 | European Pat. Off. . | |
| 0136238 | 4/1985 | European Pat. Off. . | |
| 2440674 | 3/1976 | Fed. Rep. of Germany | 324/229 |
| 2140864 | 1/1973 | France . | |
| 2534015 | 4/1984 | France . | |
| 0107764 | 8/1979 | Japan | 324/229 |
| 453424 | 9/1936 | United Kingdom | 324/229 |
| 0565561 | 11/1944 | United Kingdom | 324/230 |

Primary Examiner—Gerard R. Strecker
Attorney, Agent, or Firm—Wenderoth, Lind & Ponack

[57] ABSTRACT

A method and apparatus for measuring the thickness of thin metallic layers deposited on a conductive support, wherein the thickness is determined from the measurement of the losses corresponding to the Joule effect, due to the eddy currents which appear when a magnetic circuit excited by an alternating voltage is brought close to the metallic surface.

1 Claim, 3 Drawing Sheets

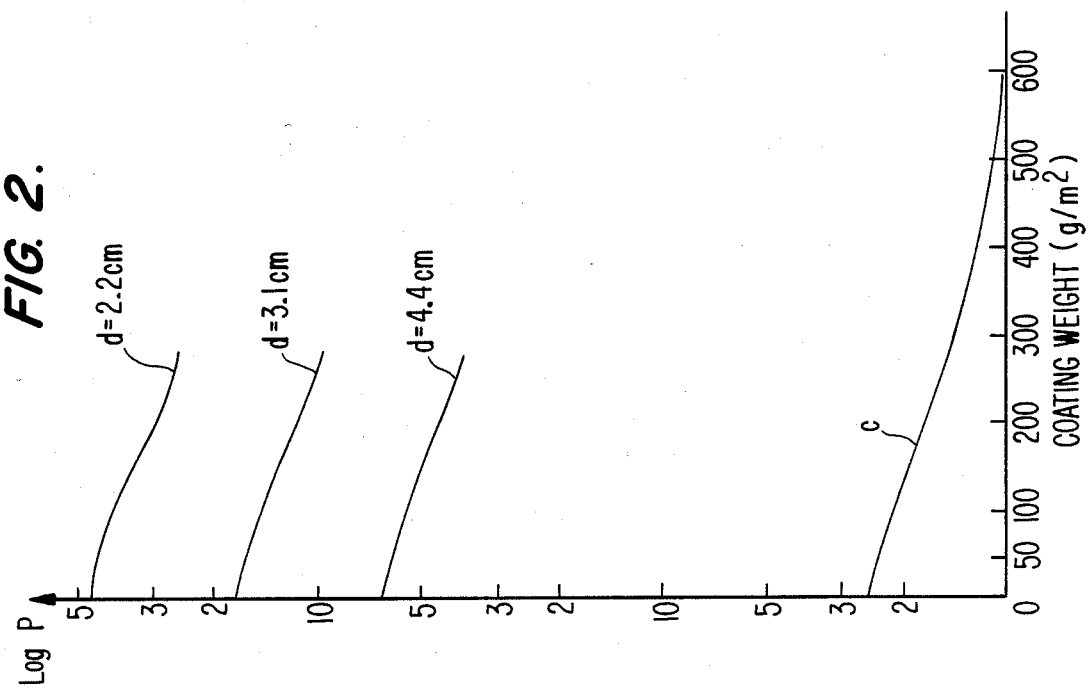
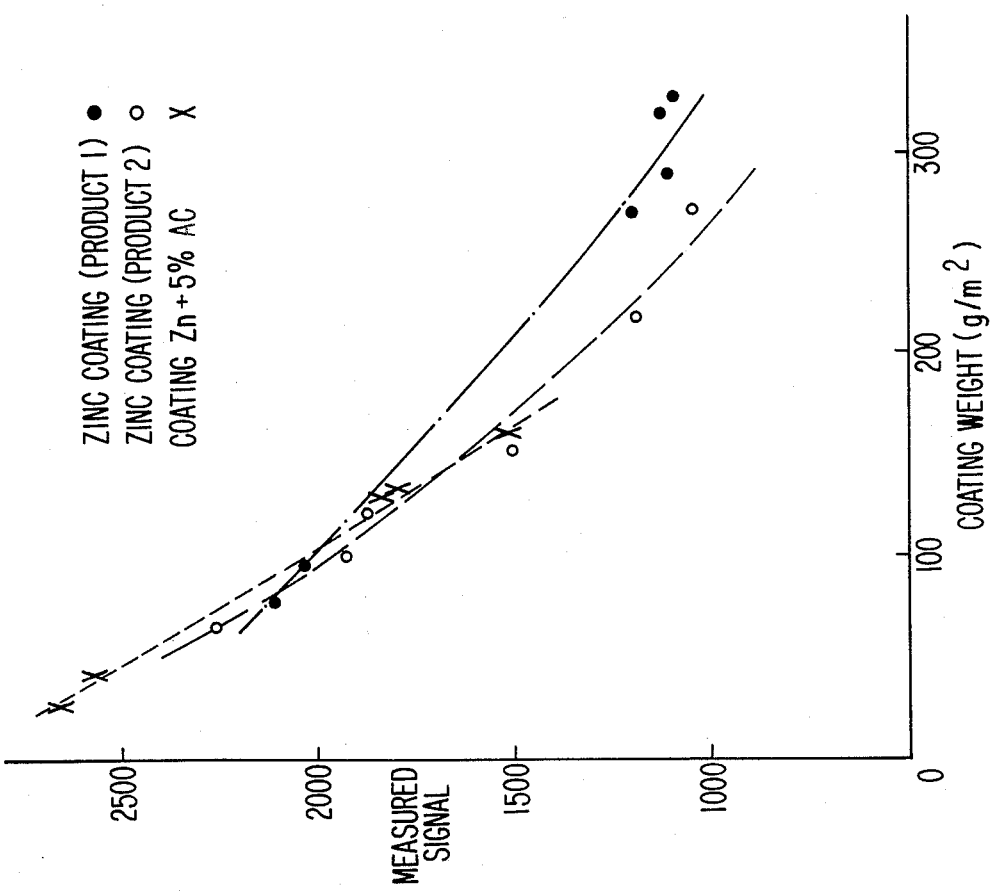

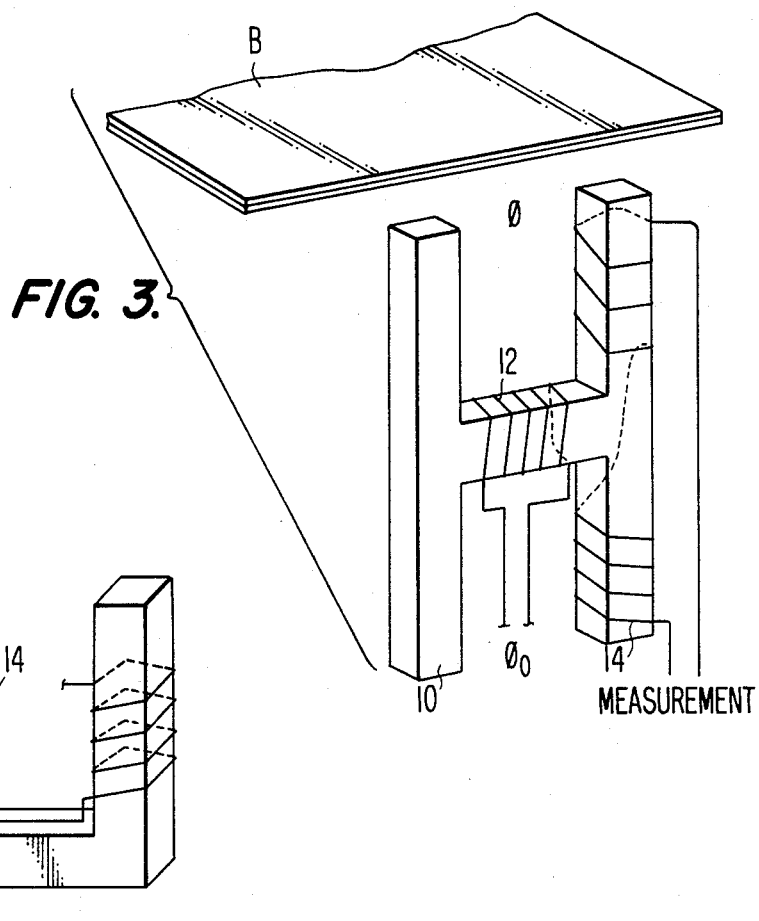
FIG. 3.
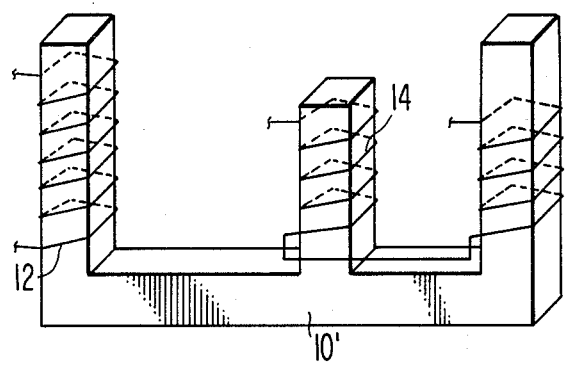
FIG. 4.
FIG. 7.
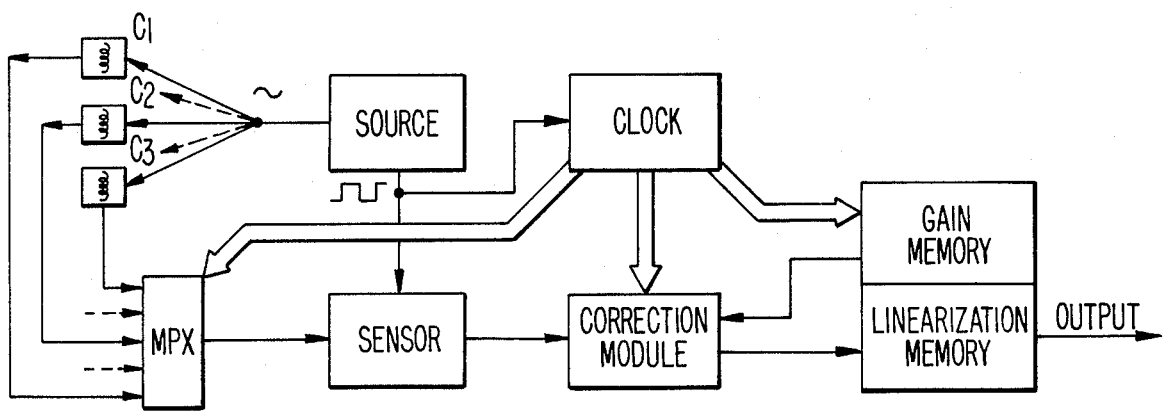

DEVICE FOR MEASURING THE THICKNESS OF THIN METALLIC LAYERS DEPOSITED ON A CONDUCTIVE SUPPORT

TECHNICAL FIELD OF INVENTION

The present invention relates to the manufacture of metallic bands retained by deposition of a thin layer of another metal, having particular properties of chemical strength, of physical appearance etc.

The cost of a filler metal deposited as a thin layer on a metallic band is most often much higher than that of the metal of the support metallic band, and it is therefore essential to control with accuracy, and during manufacture, the deposited thickness. This requirement exists more particularly in large capacity installations, and notably in installations operating continuously.

Various techniques have been developed and applied for providing thickness measurements of the thin metallic layer deposited on a metallic support.

PRIOR ART

Most of said techniques use the absorption or diffraction of an ionizing radiation ($\beta$ or X rays) in the thin layer deposited in order to determine its thickness. Other techniques are based on the deformation or weakening of a magnetic field by the filler metal on a magnetic support.

Said known techniques generally give satisfaction, but they have nevertheless disadvantages which limit their application conditions. Thus, in particular, they require that the geometrical characteristics of the support (that is, surface evenness and position) be defined with precision and be invariable. On the other hand, it is necessary to proceed with frequent calibration operations.

For the techniques using ionizing radiation sources, the cost and size of said sources preclude their multiplication for measuring a distribution of the coating thickness. In order to remedy such a difficulty, a mechanical displacement of the source is usually made, which causes an increased complexity and fragility of the installations with, moreover, when the supports are moving continuously, the presence of regions where the measurement cannot be carried out.

SUMMARY OF INVENTION

The object of the present invention is to provide a method for avoiding the hereabove mentioned disadvantages. It introduces a measuring method of the thickness of a layer of a metallic deposition accommodating the position variations of the controlled object, requiring no frequent calibrating operations and of a small cost, thereby allowing the establishment and exploitation of a large number of measuring points in a limited space.

The starting point of the method of the invention is the following recognized fact:

When the conductive metallic surface is brought close to a magnetic circuit excited by an alternating voltage, the eddy currents prevent the penetration of the alternating magnetic field in the conductive metallic surface. The presence of the metallic surface results in a modification of the magnetic circuit reluctance.

This reluctance modification depends on the distance between the magnetic circuit and the conductive metallic surface, and therefore it can be used for determining the distance of the metallic surface. This application is disclosed particularly in French Pats. No. 2 507 310 and French Pat. No. 83 05 323.

The reluctance variation, in the case of a high frequency magnetic field, is practically independent of the conductivity of the metallic surface. On the contrary, this property plays a decisive part in the losses arising from the Joule effect caused by the eddy currents. It is this recognized fact which is at the base of the present invention. Said invention is therefore essentially characterized in that the thickness of the thin metallic layer deposited on a conductive support is determined from the measurement of the losses corresponding to the Joule effect, caused by the eddy currents, which appear when a magnetic current excited by an alternating voltage is brought close to the metallic surface.

In the case of a homogeneous metal, the losses due to the eddy currents increase with the resistivity according to the equation:

$$P + \overline{K \ H_T^2} \sqrt{\omega \mu \rho} \tag{1}$$

wherein:
P: losses due to the Joule effect
$H_T^2$: average field on the conductive metallic surface
$\omega$: excitation pulsation
$\mu$: magnetic permeability
$\rho$: resistivity
K: constant For a metallic layer d having a thickness e and exhibiting the characteristics $\mu_d$ and $\rho_d$ deposited on a substrate characterized by $\mu$ and $\rho$, the losses are expressed by equation:

$$P(e) = P \frac{(1 + n)^2 \ e^{2E} - (1 - n)^2 \ e^{-2E} - 2(1 - n^2)\sin 2E}{(1 + n)^2 \ e^{2E} + (1 - n)^2 \ e^{-2E} + 2(1 - n^2)\cos 2E} \tag{1}$$

$$E = \frac{e}{S}$$

$$S = \sqrt{\frac{2\rho_d}{\omega \mu_d}}$$

$$n = \sqrt{\frac{\rho \mu}{\rho_d \mu_d}}$$

$$P = \overline{K \ H_T^2} \sqrt{\omega \mu_d \rho_d}$$

Constant K in equation (1) which expresses the losses due to the Joule effect is defined experimentally, for a given magnetic circuit, from a series of samples of known thickness.

In FIG. 1 of the accompanying drawings, some non limiting examples of the results of measurements carried out on samples of steel sheets coated with zinc and a zinc-aluminum alloy of variable thickness have been given. It will be remarked that the corresponding curves have a similar shape, in spite of the different origin and the different composition of the samples.

The experimental curves thus obtained have been determined by maintaining a constant distance between the detection system and the metallic surface. Yet, experience has shown that even the variation of such a distance, while modifying the measured signal, has no influence on the shape of the curve obtained, as can be seen in FIG. 2 which is a comparison between the measurements of losses P at various distances, and the standardization theoretical curve C. The result is that it is possible to measure the thickness of the thin metallic coating whatever the position of the metallic surface with respect to the detecting system consisting in the magnetic circuit excited by an alternating voltage.

According to the present invention, the measurement of the coating thickness, according to the hereabove discussed method, uses a U-shaped, E-shaped or H-shaped sensor (preferably in the shape of an H), provided an with excitation winding creating a flux, divided into an active flux $\phi$ and a reference flux $\phi_0$, the signal being collected at the terminals of a differential winding sensitive to $(\phi - \phi)$, the component of the signal in quadrature with the excitation corresponding to the losses, the measurement of said component, after a synchronous detection, providing the information on the thickness of the thin coating, while the component of the signal in phase with the excitation which is proportional to the reluctance provides the information on the distance of the metallic surface.

According to the invention, a massive shielding is provided around the magnetic circuit of the sensor, leaving only a small air gap in order to channel the flux and to isolate the sensor from interference.

Other features and advantages of this invention will become more apparent from the hereafter description, made in reference with the accompanying drawings illustrating various embodiments thereof, without any limiting character.

BRIEF DESCRIPTION OF DRAWINGS

In the drawings:

FIG. 1 represents some examples of curves showing the losses as a function of the weight of the coating, for bands of various origins, said curves having been discussed hereabove FIG. 2 shows curves identical to those of FIG. 1, but corresponding to different distances between the sensor and the metallic surface, said curves having been discusses hereabove.

FIG. 3 is a perspective schematic view showing a preferred embodiment of a sensor according to this invention.

FIG. 4 shows a variant of the sensor according to the invention.

FIG. 7 shows an embodiment of an electronic circuit for processing the signals transmitted by a sensor according to the invention, with a view to determining the thickness of the thin coating, at a fixed distance.

DETAILED DESCRIPTION OF INVENTION

With reference to FIGS. 3 and 4, one sees that the sensor according to the invention has preferably an H shape (FIG. 3) or an E shape (FIG. 4). Said sensor 10 is placed at a distance from band B and comprises a magnetic circuit excited by an alternating voltage which includes a common winding 12, creating a measuring flux $\phi$ and a reference flux $\phi_0$. The signal is collected at the terminals of differential winding 14, sensitive to $\phi - \phi_0$. For said sensor, the signal component in quadrature with the excitation corresponds to the losses P due to the Joule effect, the measurement of which allows determining the thickness of the thin coating deposited on band B, and the signal component in phase corresponds to the reluctance, the measurement of which can be used for determining, as known, the distance between the sensor and the metallic surface of band B.

Figure 5:
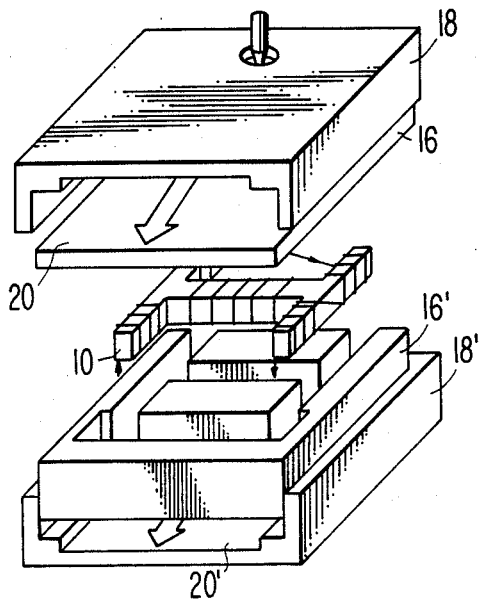
FIG. 5 is an exploded view of the sensor according to the invention, with its shielding.

FIG. 5 shows with more details the sensor according to the invention with its H structure 10, made of ferrite, including its windings, placed in a massive structure 16, 16', for example in "Dural" forming the shielding, in order to channel the flux and isolate the sensor from interference. Two shells 18, 18', of, for example, a ceramic material, provide the thermal insulation, a void 20, 20' being defined in order to allow the circulation of the cooling air.

Figure 6:
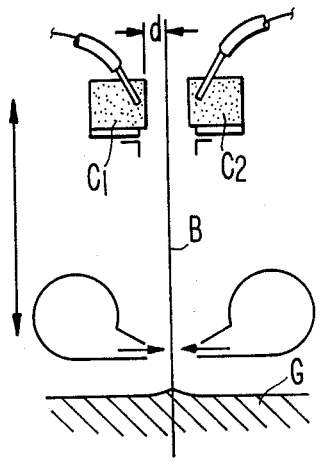
FIG. 6 is a schematic view showing the disposition of the sensors according to the invention at the outlet of a galvanizing bath.

In the schematic representation of FIG. 6 is shown how two sensors $C_1$ and $C_2$ according to the invention can be placed on either side of a band B exiting from a galvanizing bath. Of course, this is only a non limiting application example.

FIG. 7 shows an embodiment of an electronic circuit for processing the signals transmitted by the sensor and corresponding to the losses due to the Joule effect, in order to determine the thickness of the thin coating deposited on band B (the distance of the latter with respect to the sensor being fixed).

In FIG. 7, a power source supplies excitation signals $C_1$, $C_2$ and $C_3$ to three sets of excitation coils for three separate sensors.

A multiplexer module MPX selects one of the three sensor output signals based on a clock signal from a clock circuit. The multiplexer module MPX further includes therein an impedance corrector amplifier for providing the selected sensor signal at a suitable impedance level.

The output of the multiplexer module MPX is fed to a synchronous sensor which receives a signal from the power source and can synchronously detect the quadrature component of the selected multiplexed signal so as to determine the losses due to the Joule effect, thereby providing an output signals corresponding to the thickness of the thin coating deposited on the band being measured.

Alternatively, the sensor can synchronously detect the in-phase component corresponding to the reluctance, thereby providing a signal corresponding to the distance between the sensor and the metallic surface of the band being measured.

The output of the sensor is fed to a correction module for filtering the output thereof and providing suitable amplification correction if needed. In addition, an analog to digital converter is contained within the correction module for converting the corrected signal to suitable digital form.

The correction module is controlled by the same clock generator used to generate the signals to control the multiplexer module MPX.

The output of the correction module is fed to a linearization memory for storage and additional digital correction if necessary.

The gain memory, controlled by signals from the aforesaid clock generator stores suitable gain corrections for utilization by the correction module.

In summary, the circuit of FIG. 7 can measure and store and provide in a suitable digital format signals corresponding to the thicknesses of three different coatings on three different bands.

This processing circuit only allows thickness measurements of thin coatings at a fixed distance. For making simultaneously distance and thickness measurements, two detection routes are generally needed, at 0° and $\pi/2$ for measuring the losses and the reluctance. The use of two detection routes can also be useful, for a measurement of the distance, if one wishes to correct the indication provided by the sensor as a function of the penetration of the magnetic field in the metal. It can also be used, for a measurement of the thickness, to correct the influence of the distance, if the accurate positioning at a fixed distance of the sensor is not possible.

In the general case, the distance and thickness can be recalculated after a calibration by a two variable algorithm from the losses and reluctance measurements $S(\pi/2)$ and $S_o$.

Figure 8:
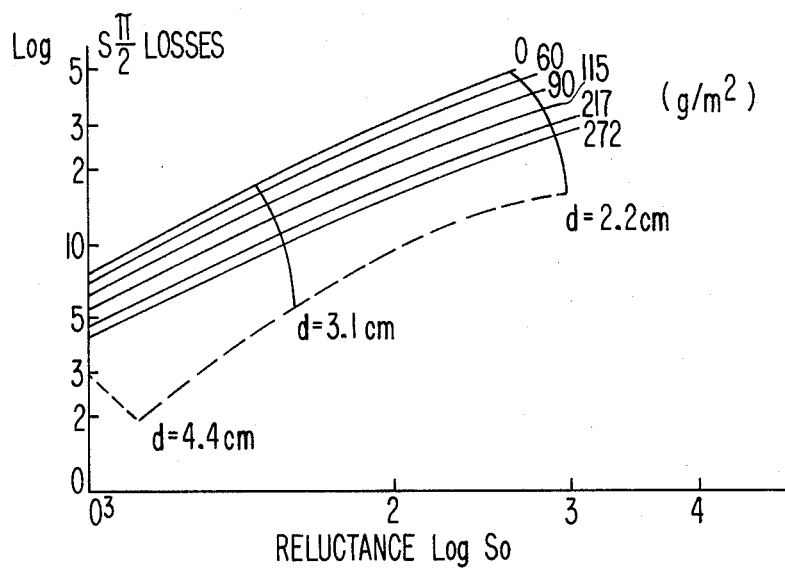
FIG. 8 shows families of curves of the reluctances and losses, for a constant thickness and a constant distance.
Figure 9:
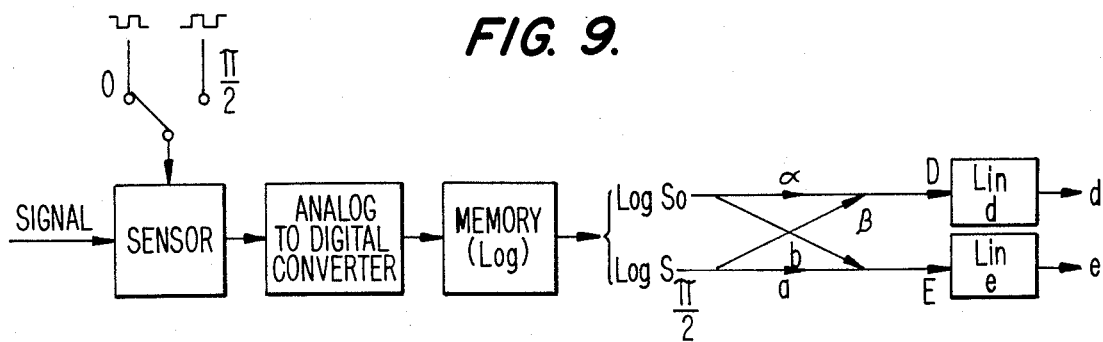
FIG. 9 shows an embodiment of an electronic circuit for processing the signals transmitted by a sensor according to the invention, with a view to simultaneously determining the thickness of the thin coating and its distance with respect to the sensor.

Yet, the measurement results (FIG. 8) show that the reluctance and losses curves for a constant thickness and a constant distance, form substantially families of parallel straight lines in logarithmic scales, this being due in theory to the fact that the reluctance varies in proportion to $H_T$ and the losses in proportion to $H_T^2$. Therefore, two linear combinations can be formed:

$$D = \alpha \text{Log } S_o + \beta \text{Log} S \frac{\pi}{2}$$

$$E = a \text{Log } S_o + b \text{Log} S \frac{\pi}{2}$$

which are respectively a function of the distance alone or of the thickness alone. The distance and thickness can then be determined, starting from D and E, by a simple one variable linearization. It will be noted that it is possible to use a single detection route, the control phase of the sensor being commutated from 0 to ($\pi/2$). The linearization memory can be used for carrying out the logarithmic transformation of $S_o$ and $S$ ($\pi/2$). FIG. 9 shows schematically a processing circuit of the signals from the sensor of the invention, according to this mode of operation.

In FIG. 9, the signal from a sensor (not shown) is fed to a synchronous sensor which alternatively receives signals from a source (not shown) used to drive the sensor, said signals alternatively allowing the sensor to detect the in-phase and quadrature components.

The sensor output is fed to an analog to digital converter whose output is fed to a memory module which stores both the in-phase and quadrature digital values as well as performing a logarithmic conversion thereof.

The logarithmic values are then multiplied by the appropriate constants (schematically indicated as multipliers in the transmission paths) and then fed to linearization circuitry d and e so as to generate outputs corresponding to the two abovenoted equations.

In the abovenoted fashion, both the distance and thickness measurement can thereby be determined.

Of course, the present invention is not limited to the various embodiments shown and described, and it encompasses all alternatives thereof.

What I claim is:

1. A device for measuring the thickness of a thin metallic layer disposed on a conductive support comprising:

a magnetic sensor, said sensor including a magnetic core having a shape selected from the group consisting of a U shape, an E shape and an H shape, said sensor having an excitation winding and a measurement winding on said core and said sensor arranged adjacent to the thin metallic layer disposed on a conductive support;

an excitation source connected to said excitation winding for causing said excitation winding to generate a magnetic flux, said measurement winding being arranged so as to generate a measurement signal having both in-phase and quadrature components and corresponding to a measured flux which is a portion of said flux generated by said excitation winding;

a magnetic shielding means arranged so as to enclose said magnetic sensor and the thin metallic layer disposed on a conductive support so as to channel said magnetic flux generated by said excitation winding and so as to isolate said magnetic sensor from interference;

a synchronous detector connected to said measurement winding and said excitation source for generating a quadrature component signal of said measurement signal having a magnitude which corresponds to the thickness of the thin metallic layer and for generating an in-phase component signal of said measurement signal having a magnitude which corresponds to the distance between said sensor and said metallic layer;

a processing means for receiving said in-phase component signal of said measurement signal and quadrature component signal of said measurement signal from said synchronous detector and for generating an indication of the thickness of the thin metallic layer in accordance with the quadrature component signal and the distance between the thin metallic layer and said magnetic sensor in accordance with the in-phase component signal.

* * * * *